Patented June 6, 1944

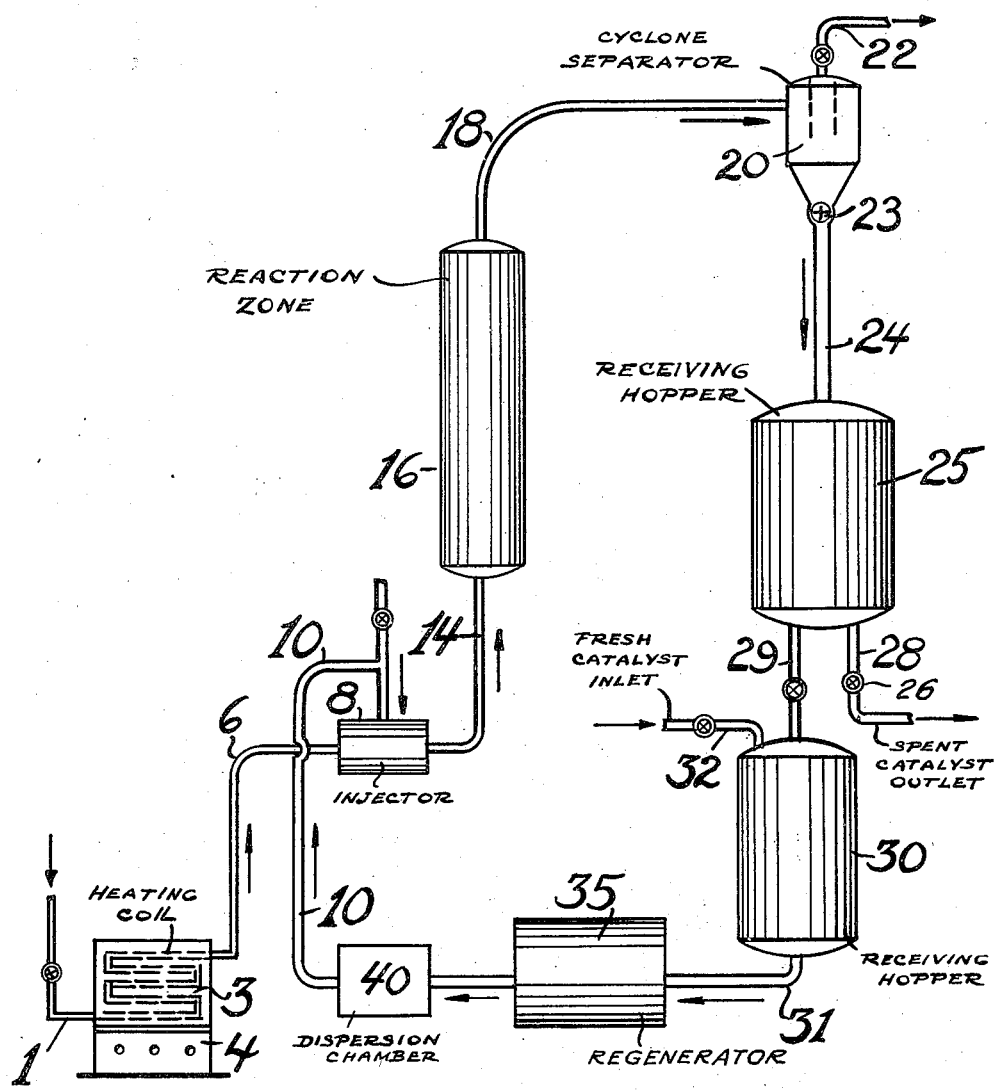

2,350,508

UNITED STATES PATENT OFFICE 2,350,508

CONVERSION OF HYDROCARBON OILS

Charles E. Hemminger, Westfield, N. J., assignor to Standard Oil Development Company, a corporation of Delaware Application November 22, 1940, Serial No. 366,594

3 Claims. (Cl. 196—52)

The present invention relates to improvements in the catalytic conversion or cracking of hydrocarbon oils and in particular it relates to improvements in the continuous cracking of the said hydrocarbon oils in a process in which a powdered catalyst is suspended in the oil vapors during the cracking operation.

In a process of the type here described, a powdered catalyst, say, an acid-treated clay having a particle size of from about 200 to 400 mesh, is dispersed in a gas oil heated to a temperature of about 825° F. or at least sufficiently high to vaporize the oil. The suspension of catalyst in hydrocarbon oil vapors is caused to flow through a reaction zone which may be, for example, a coil disposed in a furnace, in which coil the suspension remains for a sufficient time to effect the desired conversion. Thereafter the suspension is withdrawn from the coil and discharged into one or more cyclone separators or their equivalent devices, whereupon the catalyst which has become contaminated with carbonaceous deposits during the reaction is separated from the vapors and dispersed in an oxidizing gas such as air and thereafter conducted to a regeneration zone where the contaminants are removed from the catalyst by combustion thereof. From the regeneration zone the catalyst is recycled to a zone where it is dispersed in fresh feed in vapor form and reused in the suspension.

In a process of the foregoing type, a time comes when the catalyst, due to repeated use and regeneration, permanently loses its activity and must be replaced. My present invention relates to improvements in the process above described in which I continuously remove used catalyst from the system and add a corresponding amount of fresh or newly prepared catalyst.

One object of my invention is to continuously add and withdraw from a continuous cracking process employing powdered catalyst the spent catalyst and to continuously add fresh or unused catalyst in amounts corresponding to that withdrawn from the system.

Another object of my invention is to maintain the catalytic activity of the catalyst used in a continuous cracking operation wherein the catalyst is suspended in the vapors during the reaction by continuously removing spent catalyst and adding fresh or unused catalyst in amounts corresponding to that withdrawn.

The main advantage of my invention is that I maintain the activity of the catalyst substantially uniform in a process of the type heretofore described. The beneficial result of so operating is that the catalyst is neither too active nor too inactive at any time during the cracking operation. That is to say, if one were to periodically remove all of the spent catalyst from the system, the addition of fresh or unused catalyst would cause overcracking and the formation of excessive amounts of coke and gas. On the other hand, catalyst which has had a relatively long life in the system would obviously have a much lower activity during the latter portion of its life. As a result, therefore, in my process I am enabled to adjust the optimum catalyst activity and thus secure the benefits of relatively high conversions without excessive formation of either coke or gas. My invention will be best understood by the description of a preferred method of operating in connection with a flow diagram.

The figure represents diagrammatically a combination of apparatus elements in which my present invention may be carried into effect.

Referring in detail to the drawing, a charging stock comprising gas oil boiling within the range of from 400° to 800° F. and having an A. P. I. gravity of about 30° is fed into the system through line 1 and then discharged into a coil 3 disposed in a furnace setting 4 where the oil is heated sufficiently to vaporize the same, say, to a temperature of 850° F. The vaporized oil is then withdrawn from coil 3 through line 6 and discharged into an injector 8. At the same time powdered catalyst from a source which will hereafter be more fully located and described is discharged into the injector 8 through line 10. The catalyst in line 10 is preferably dispersed in a gas, such as steam, flue gas, $H_2$, or the like, and injector 8 effects a combination of the vapors and gaseous suspension and the admixture is withdrawn from the injector through line 14 and discharged into a reaction zone 16 which may be simply an insulated shell or retort. The vapors are permitted to remain in reactor 16 for a sufficient period of time to effect the desired conversion, say, a 40% conversion, of the gas oil to gasoline. The time that the catalyst and oil vapors are retained in the reaction zone 16 depends, of course, on the nature of the stock. Ordinarily, from 5 to 25 seconds residence time is sufficient to effect the desired result. The cracked products are withdrawn from the reaction vessel through line 18 and discharged into a cyclone separator 20 where the catalyst is separated from the vapors. The vapors are withdrawn through line 22 and delivered to fractionating equipment (not shown) to separate gasoline from unconverted gas oil. The recovery of gasoline by fractionation and condensation and the recycling of unconverted gas oil to the reaction zone may be accomplished in any known and convenient manner and they are not illustrated here because they per se form no part of my present invention.

The catalyst, on the other hand, is discharged into a receiving hopper 25 through a star feeder 23 and a conduit 24. A gas seal is effected between the cyclone separator 20 and receiving hopper 25 by means of star feeder 23, the receiving hopper being open to the atmosphere through vlve 26. From receiving hopper 25 a portion of the spent catalyst may be rejected from the system through outlet 28 which may be an ordinary valved pipe as shown at the base of the said hopper. The catalyst not withdrawn through line 28, that is the bulk of catalyst contained in hopper 25, is withdrawn through valved line 29 and discharged into a second hopper 30. The hopper 30 is provided with an inlet 32 through which fresh or unused catalyst may be introduced into said hopper 30 in amounts corresponding to that withdrawn from hopper 25 through line 28. Of course, the amount of catalyst that is withdrawn from the hopper 25 will depend entirely upon the particular process in which the catalyst is used. In processing certain stocks, the lifetime of the catalyst is much shorter than in processing other stocks. When operating on a West Texas crude, I have found it desirable to withdraw from 0.01% to 0.1% of catalyst continuously from hopper 25 and to add a corresponding amount of fresh or unused catalyst to hopper 30. While I have indicated that it is generally more advantageous to maintain a constant inventory of catalyst in the system, there may be situations where this amount would vary at least for a period of time and, therefore, it is within the purview of my invention to include catalyst addition and withdrawal in such amounts as to cause the total amount of catalyst in the system to vary from time to time. The important desideratum is to maintain the catalyst activity substantially constant, even if it is necessary to vary the total amount of catalyst in the system from time to time. In order to effect good admixture of spent and fresh or unused catalyst, the capacity of receiving hoppers 25 and 30 should be relatively small. Another reason why the receiving hoppers should be relatively small is that the catalyst should not be permitted to remain resident therein for an extended period of time, since it would obviously lose heat and heat is useful in the subsequent regeneration to which the catalyst must be subjected. Moreover, added residence time of the catalyst per cycle decreases the catalyst activity per cycle. The mixture of spent and fresh catalyst is withdrawn from the receiving hopper 30 through a line 31 and then regenerated by any convenient method, such as combustion of the catalyst contaminants in a system represented generally by 35, whereupon the catalyst is dispersed in steam or the like and in a dispersion chamber represented by 40 and then conveyed through line 10 to the injector 8 and reused in the process. The precise method of regenerating the catalyst forms no part of the present invention and therefore need not be described in detail, since any known method may be employed.

In the foregoing description, I have disclosed a method in which the spent catalyst before regeneration is admixed with the fresh or unused catalyst. It is also within the concept of my invention to first regenerate the catalyst and thereafter withdraw a portion of the regenerated catalyst and add a corresponding amount of fresh or unused catalyst.

It is also within the purview of my invention to apply my improvements to a catalytic cracking operation in which the catalyst moves through the reaction zone on a moving belt, or other conveying means such as a Redler conveyor.

To summarize briefly, my invention relates to improvements in the catalytic cracking of hydrocarbon oils characterized chiefly by the feature that the activity of the catalyst is maintained substantially constant by continuously withdrawing a portion of spent catalyst and at the same time adding a corresponding amount of fresh or unused catalyst to the system. The rate of replacement of catalyst is governed entirely by the activity and the aging characteristics of the catalyst. While I have mentioned only clay as a catalyst, it is to be understood that I may use certain synthetic catalysts, such as alumina-silica compounds, magnesia-alumina compounds, and the like. With respect to the rate of replacement of these various catalysts, it is pointed out that the rate is greatest with the natural clays because they lose activity at a greater rate than the synthetic catalyst. It is also pointed out that a distinct advantage of my process is that by controlling the activity of the catalyst I am enabled to prevent overcracking.

While catalytic cracking is cited as an example of my process, the same principles are applicable to other catalytic processes where the catalyst loses activity with time. Examples of such are treating of distillates with bauxite, polymerization of olefins, dehydrogenation of butane and other catalytic processes where an inorganic or organic material is treated in the presence of a catalyst.

It will be understood that my present invention is not limited to the precise details hereinbefore set forth, but includes all equivalent modifications thereof not excluded from the terms of the appended claims.

I claim:

1. A process for the conversion of hydrocarbon oils which comprises passing the oil to be converted in the vapor phase through a conversion zone, contacting the oil vapors within said conversion zone with a finely divided solid conversion catalyst, keeping said conversion zone at active conversion temperature, maintaining said oil vapors within the conversion zone for a period sufficient to obtain a substantial conversion thereof, continuously removing finely divided conversion catalyst containing carbonaceous deposits from said conversion zone, continuously rejecting a portion of the conversion catalyst so removed, continuously adding a portion of fresh conversion catalyst to the remainder of said finely divided solid conversion catalyst so removed, the amounts of that added portion corresponding to the amounts of that rejected portion so as to maintain a constant average conversion activity of the catalyst during an extended period of time, passing the resulting mixture through a regenerating zone containing an oxidizing atmosphere to thereby burn carbonaceous deposits contained on the catalyst removed from said conversion zone, continuously withdrawing the mixture of regenerated catalyst and fresh catalyst from the regenerating zone and continuously returning said mixture to the conversion zone.

2. A process for cracking hydrocarbon oil which comprises passing the oil to be cracked in the vapor phase through a cracking zone, contacting the oil vapors within said cracking zone with a finely divided solid cracking catalyst, keeping said cracking zone at active cracking temperature, maintaining the oil vapors within the cracking zone for a period sufficient to obtain substantial cracking thereof, continuously withdrawing finely divided cracking catalyst containing carbonaceous deposits from the cracking zone, continuously rejecting a portion of the catalyst containing said carbonaceous deposits, continuously adding a fresh portion of finely divided cracking catalyst to the remainder of said catalyst withdrawn from said cracking zone, the amounts of that added portion corresponding to the amounts of that rejected portion so as to maintain a constant average cracking activity of the catalyst during an extended period of time, passing the resulting mixture of fresh catalyst and catalyst removed from said cracking zone to a regenerating zone, maintaining an oxidizing atmosphere within said regenerating zone to burn carbonaceous deposits from said catalyst, continuously removing catalyst from the regenerating zone and returning it to the cracking zone.

3. A process for the conversion of hydrocarbon oil which comprises forming a suspension of oil vapors to be cracked and finely divided conversion catalyst, passing the resulting suspension through a conversion zone maintained at active conversion temperature, keeping the oil vapors within said conversion zone for a period sufficient to obtain substantial conversion thereof, continuously removing the suspension of conversion products and finely divided conversion catalyst containing carbonaceous deposits from said conversion zone, separating said catalyst from the conversion products, continuously rejecting a portion of the catalyst so separated, continuously adding fresh catalyst to the remainder of said finely divided catalyst so separated, the amounts of that added portion corresponding to the amounts of that rejected portion so as to maintain a constant average conversion activity of the catalyst during an extended period of time, passing the resulting mixture through a regenerating zone, burning carbonaceous deposits from said catalyst during passage through said regenerating zone and thereafter combining said regenerated catalyst with said first-mentioned oil vapors to be converted.

CHARLES E. HEMMINGER.